United States Patent [19]

Fetcenko et al.

[11] Patent Number: 5,330,861
[45] Date of Patent: Jul. 19, 1994

[54] METAL HYDRIDE CELLS HAVING IMPROVED CYCLE LIFE AND CHARGE RETENTION

[75] Inventors: Michael A. Fetcenko, Rochester Hills; Stanford R. Ovshinsky, Bloomfield Hills, both of Mich.

[73] Assignee: Ovonic Battery Company, Inc., Troy, Mich.

[21] Appl. No.: 879,823

[22] Filed: May 7, 1992

[51] Int. Cl.$^5$ .............................. H01M 4/38
[52] U.S. Cl. ........................ 429/57; 429/59; 429/101; 420/900
[58] Field of Search .................. 429/59, 101, 57; 420/900

[56] References Cited

U.S. PATENT DOCUMENTS

| | | | |
|---|---|---|---|
| 4,551,400 | 11/1985 | Sapru et al. | 429/101 X |
| 4,728,586 | 3/1988 | Venkatesan et al. | 429/101 X |
| 4,849,205 | 7/1989 | Hong | 429/207 X |
| 5,096,667 | 3/1992 | Fetcenko | 429/57 X |
| 5,104,617 | 4/1992 | Fetcenko et al. | 429/57 X |

Primary Examiner—Prince Willis, Jr.
Assistant Examiner—M. Nuzzolillo
Attorney, Agent, or Firm—Marc J. Luddy; Marvin S. Siskind; David W. Schumaker

[57] ABSTRACT

A rechargeable hydrogen storage cell comprising: a negative electrode having the composition:

(Ovonic Base Alloy)$_a$M$_b$ where Ovonic Base Alloy represents an Ovonic alloy that contains 0.1 to 60 atomic percent Ti, 0.1 to 25 atomic percent Zr, 0.1 to 60 atomic percent V, 0.1 to 57 atomic percent Ni, and 0.1 to 56 atomic percent Cr, as described above; a is at least 70 atomic percent; M represents at least one modifier chosen from the group consisting of Co, Mn, Al, Fe, W, La, Mo, Cu, Mg, Ca, Nb, Si, and Hf; b is 0 to 30 atomic percent; b>0; and a+b=100 atomic percent; a positive electrode; and a separator of electrolyte retentive nylon or wettable polypropylene.

22 Claims, 1 Drawing Sheet

METAL HYDRIDE CELLS HAVING IMPROVED CYCLE LIFE AND CHARGE RETENTION

FIELD OF THE INVENTION

The present invention relates generally to improved metal hydride cells having improved cycle life and charge retention. More particularly, the invention relates to the optimization of the negative electrode alloys and the separator in order to improve cycle life and charge retention.

BACKGROUND OF THE INVENTION

In rechargeable electrochemical cells, weight and portability are important considerations. It is also advantageous for rechargeable cells to have long operating lives without the necessity of periodic maintenance. Rechargeable cells may be used as direct replacements for primary AA, C, and D cells in numerous consumer devices such as calculators, portable radios, and flashlights. They are often configured into a sealed power pack that is designed as an integral part of a specific device. Rechargeable electrochemical cells can also be configured as larger cells that can be used, for example, in industrial, aerospace and electric vehicle applications.

The best rechargeable cell is one that can operate as an "install and forget" power source. With the exception of periodic charging, a rechargeable cell should perform without attention and should not become a limiting factor in the life of the device it powers.

There are two basic types of nickel metal hydride rechargeable hydrogen storage materials ("Ni-MH materials")the $AB_2$ type and the $AB_5$ type. These types of material are discussed in detail in U.S. Pat. No. 5,096,667 to Fetcenko, et. al, the contents of which are incorporated herein by reference. The term "Ovonic alloy" is frequently used to refer to all $AB_2$ type materials in deference to their development from amorphous thin film materials discovered by Stanford R. Ovshinsky. Ovonic alloys are described in U.S. Pat. No. 4,551,400 for Hydrogen Storage Materials and Methods of Sizing and Preparing the Same for Electrochemical Applications (hereinafter the '400 patent) to Sapru, Hong, Fetcenko and Venkatesan, the contents of which are incorporated herein by reference.

As used herein, the term "Ovonic Base Alloy" refers to an $AB_2$ alloy having a base alloy or grain phase (as this term is described in the '400 patent) containing 0.1 to 60 atomic percent Ti, 0.1 to 25 atomic percent Zr, 0.1 to 60 atomic percent V, 0.1 to 57 atomic percent Ni, and 0.1 t 56 atomic percent Cr.

In general, Ni-MH hydrogen storage cells or batteries (referred to collectively as "Ni-MH cells") utilize a negative electrode that is capable of the reversible electrochemical storage of hydrogen. Ni-MH cells usually employ a positive electrode of nickel hydroxide material. The negative and positive electrodes are spaced apart in an alkaline electrolyte.

Upon application of an electrical potential across a Ni-MH cell, the Ni-MH material of the negative electrode is charged by the electrochemical absorption of hydrogen and the electrochemical evolution of a hydroxyl ion:

The negative electrode reactions are reversible. Upon discharge, the stored hydrogen is released to form a water molecule and evolve an electron.

The reactions that take place at the positive electrode of a secondary cell are also reversible. For example, the reactions at a nickel hydroxide positive electrode in a Ni-MH cell are:

A suitable separator is usually positioned between the electrodes of Ni-MH cells. The electrolyte is generally an alkaline electrolyte, for example, 20 to 45 weight percent potassium hydroxide. Lithium hydroxide may also be present in limited quantity.

A Ni-MH cell has an important advantage over conventional rechargeable cells and batteries: Ni-MH cells have significantly higher specific charge capacities (both in terms of ampere hours per unit mass and ampere hours per unit volume) than do cells with lead or cadmium negative electrodes. As a result, a higher energy density (in terms of watt hours per unit mass or watt hours per unit volume)is possible with Ni-MH cells than with conventional systems, making Ni-MH cells particularly suitable for many commercial applications.

Rechargeable cells are generally either vented cells or sealed cells. During normal operation, a vented cell typically permits venting of gas to relieve excess pressure as part of the normal operating behavior. In contrast, a sealed cell generally does not permit venting on a regular basis. As a result of this difference, the vent assemblies and the amounts of electrolyte in the cell container relative to the electrode geometry both differ significantly.

Vented cells operate in a "flooded condition." The term "flooded condition" means that the electrodes are completely immersed in, covered by, and wetted by the electrolyte. Thus, such cells are sometimes referred to as "flooded cells." A vented cell is typically designed for normal operating pressures of about 25 pounds per square inch after which excess pressures are relieved by a vent mechanism.

A variation of the vented, cylindrical, rechargeable cells of the prior art are the "one time only" venting cells where, for example, a rupturable diaphragm and blade apparatus is employed. As internal cell pressure increases, the blade is forced against the diaphragm. As the pressure increases further, the blade punctures the diaphragm, allowing excess gases to escape. This destructive type of venting mechanism is both unpredictable from batch to batch and from cell to cell within a batch. Moreover, destructive venting is good for only one excessive pressure situation. After the diaphragm is punctured, it cannot even sustain normal cell operating pressures.

In contrast, sealed cells are designed to operate in a "starved" electrolyte configuration, that is with a minimum amount of electrolyte. The enclosure for a sealed cell is normally metallic and designed for operation of up to about 100 p.s.i. absolute or higher. Because they are sealed, such cells do not require periodic maintenance.

Typically, a sealed rechargeable cell uses a cylindrical nickel-plated steel case as the negative terminal and the cell cover as the positive terminal. An insulator separates the positive cover from the negative cell can. The electrodes are wound to form a compact "jelly roll" with the electrodes of opposite polarity isolated from each other by a porous, woven or non-woven separator of nylon or polypropylene, for example. A tab extends from each electrode to create a single current path through which current is distributed to the entire electrode area during charging and discharging. The tab on each electrode is electrically connected to its respective terminal.

In sealed cells, the discharge capacity of a nickel based positive electrode is limited by the amount of electrolyte, the amount of active material, and the charging efficiencies. The charge capacity of a Ni-MH negative electrode is limited by the amount of active material used, since its charge efficiency is nearly 100 percent, nearly a full state of charge is reached. To maintain the optimum capacity for a Ni-MH electrode, precautions must be taken to avoid oxygen recombination or hydrogen evolution before full charge is reached. This is generally accomplished by providing an excess of negative electrode material. However, precautions must be taken in the design and fabrication of sealed cells to avoid the effects of over-pressurization associated with overcharge at dangerously high charge rates. Sealed cells are the preferred type of rechargeable, Ni-MH electrochemical cells where a particular application requires a relatively maintenance-free power source.

The operational life span, that is, the available number of charge and discharge cycles of a sealed cell, typically determines the kinds of applications for which a cell will be useful. Cells that are capable of undergoing more cycles have more potential applications. Thus, longer life span cells are more desirable.

The life span of a sealed cell is directly related to the life span of its individual components. The negative electrode materials are the most unique and have long been considered to be the component limiting cell life span. Therefore, to achieve longer life spans, researchers concentrated their efforts on producing an electrode alloy material capable of withstanding repeated charge and discharge cycles without breakdown. See, for example, U.S. Pat. No. 4,728,586 for Enhanced Charge Retention Electrochemical Hydrogen Storage Alloys and an Enhanced Charge Retention Electrochemical Cell, the disclosure of which is incorporated by reference. However, Ovonic alloy negative electrode materials have been developed to the point where they are no longer the only component of the rechargeable cell that limit the life span of the entire cell.

The present inventors have found that in sealed Ni-MH cells using some of the Ovonic Base Alloys described herein, cell failure is sometimes the result of problems related to the separator, such as the depletion of electrolyte from the separator and separator degradation. Thus, given the advances in Ovonic Base Alloy negative electrode materials described herein, the separator appears to be another factor in the cycle life and charge retention of the Ovonic Base Alloy cells of the present invention.

Nylon separators have been described in a variety of configurations and in a variety of cells. For example, U.S. Pat. No. 3,147,150, to Carl et al. of Yardney, describes a battery using a separator made from a nylon film coated on fabric or resinous fiber. In addition, U.S. Pat. No. 4,699,858, to Masaki of Freudenberg, describes a rechargeable alkaline battery having an ion transporting alkaline electrolyte and a nonwoven polyamide separator made from continuous fiber of 3 to 10 microns treated with non-ionic surface active agents.

Generally, nylon separators of the type found in NiCd rechargeable batteries have been used as the standard separator in all types of Ni-MH cells. Such nylon separators were specifically designed to prevent the short circuits that occur in NiCd cells due to the formation of dendrites between the electrodes as they change from a metal to a metal hydroxide in the charge/discharge cycle. These dendrites short circuit the NiCd negative terminal to the positive terminal if left unchecked. The nylon separator acts as a barrier layer to prevent such dendrite formation.

Although dendrite formation is not a concern in Ni-MH cells, nylon separators are frequently used in Ni-MH cells because during the early development of Ni-MH cells, nylon separators were readily available and appeared to function adequately with $AB_5$ alloy cells, as well as with Ovonic alloy cells, of the prior art. However, the present invention recognizes that in the Ovonic Base Alloy cells of the present invention, prior art nylon separators do not function adequately. The prior art nylon separators when used in Ovonic alloy cells are, for example, prone to breakdown and loss of electrolyte (drying out) after repeated cycling. Further, prior art nylon separators eventually react with the electrolyte in Ovonic alloy cells forming decomposition products which may adversely effect cell performance. As a result, nylon separators when used in Ovonic alloy cells appear to be a significant factor in limiting the potential cycle life of such cells.

Polypropylene separator materials have been used in lead acid batteries because of their resistance to sulfuric acid. For example, U.S. Pat. No. 3,870,567, to Palmer et al. of W. R. Grace, describes separators made from nonwoven mats that are compressed to yield small pores of high porosity. These mats are formed from hydrophobic polymeric materials. The fibers of the mat are made wettable by mixing the polymeric resin with a wetting agent prior to extrusion. This reference specifically teaches that polyolefins such as polypropylene are useful in lead acid batteries, and that nylon is the preferred material for use in alkaline batteries.

The following art suggests polypropylene separators as an alternative to nylon because polypropylene is strong and resistant to alkaline electrolyte, although its hydrophobic properties when compared to nylon require treatment with a wetting agent or its combination with another material:

U.S. Pat. No. 3,907,604, to Prentice of Exxon Research, describes a nonwoven polypropylene mat that has been fuse-bonded using a press to increase its tensile strength.

U.S. Pat. No. 3,947,537 to Butin et al. of Exxon Research, describes a process for making battery separators from nonwoven mats where the formed nonwoven mat is treated with a wetting agent, dried, heated, and compressed to increase fiber-to-fiber bonding.

U.S. Pat. No. 4,190,707 to Doi et al. of Asahi, describes a separator made of a porous polyolefin film having low electrical resistance and high alkaline resistance.

U.S. Pat. No. 4,414,090, to D'Agostino of RAI Research, describes a separator for a redox cell comprising a polyolefin base film grafted to a vinyl substituted monomer with gamma radiation.

U.S. Pat. No. 4,430,398, to Kujas of RCA, describes a polypropylene separator for NiCd cells prepared from knitted, woven, or nonwoven polypropylene that is treated with a corona discharge and then impregnated with phenylglycine or parahydroxyphenylglycine. The corona discharge functions to increase the wettability of the separator, and glycine derivative acts to prevent the penetration of the separator sheet by the alkaline electrolyte and metallic particles from the electrodes.

U.S. Pat. No. 5,077,149, to Ikoma of Matsushita, describes a misch metal negative electrode, a nickel hydroxide positive electrode, and a sulfonated, non-woven polypropylene separator. The negative electrode, the positive electrode, and the separator all contain a zinc compound, such as zinc oxide, so that the electrolyte is retained in the negative electrode and the separator and does not migrate to the positive electrode, thus reducing the expansion of the positive electrode. In addition, the separator is treated with a hydrophobic resin. This patent states that expansion of the positive electrode causes a change in the electrolyte distribution and an increase in internal resistance which makes nickel/hydrogen cells have an inferior cycle life compared to NiCd cells.

The plethora of references describing different kinds of separators contains no indication that any one type of separator would be superior for any particular application or superior with any particular alloy or electrolyte. While all types of batteries have similar component parts, the extreme differences in chemistry make applying teachings from one type of battery to another unpredictable. "Swapping" of components does occur, but the present inventors are unaware of any instance where any research in the development of Ovonic alloys has been hastened as a result. For example, the use of NiCd nylon separators in Ni-MH cells as discussed above, proved adequate for all Ni-MH alloys initially, however these same separators now appear to be a limiting factor in realizing the full potential of the Ovonic Base Alloys of the present invention. Unfortunately, the prior art contains no theory or suggestion regarding a separator that might overcome this problem.

The inadequacy of the prior art is illustrated in U.S. Pat. No. 5,077,149 ("the '149 patent"), to Ikoma of Matsushita, discussed above. Read in its entirety, the '149 patent focuses on controlling the swelling of the positive electrode with zinc and fails to disclose any teaching relevant to the Ovonic Base Alloys of the present invention. The '149 patent teaches using misch metal, an AB$_5$ Ni-MH material that those of skill in the art know has an electrochemical behavior different than Ovonic alloys. A number of manufacturers became interested in AB$_5$ alloys because these alloys appeared to be drop in replacements for NiCd negative electrodes. However, as discussed in detail in U.S. Pat. No. 5,096,667, AB$_5$ materials represent a different class of materials from Ovonic alloys. This is particularly true of the Ovonic Base Alloys of the present invention.

It should be noted that prior art Ovonic alloys have yielded adequate performance when used as a drop in replacement negative electrode for NiCd cells. However, the performance of Ovonic Base Alloys of the present invention can be significantly improved by using an optimized separator material.

In general, the references discussed above, contain no teaching or suggestion that some Ovonic Base Alloys cells will have an improved cycle life and reduced self-discharge when used with an appropriately chosen separator.

SUMMARY OF THE INVENTION

The present invention describes a rechargeable Ni-MH hydrogen storage cell having improved cycle life; improved charge retention; and both improved cycle life and improved charge retention.

One aspect of the present invention is a rechargeable hydrogen storage cell comprising a negative electrode having the following composition:

(Ovonic Base Alloy)$_a$M$_b$ where Ovonic Base Alloy represents an Ovonic alloy that contains 0.1 to 60 atomic percent Ti, 0.1 to 25 atomic percent Zr, 0.1 to 60 atomic percent V, 0.1 to 57 atomic percent Ni, and 0.1 to 56 atomic percent Cr, as described above; a is at least 70 atomic percent; M represents at least one modifier chosen from the group consisting of Co, Mn, Al, Fe, W, La, Mo, Cu, Mg, Ca, Nb, Si, and Hf; b is 0 to 30 atomic percent; b>0; and a+b=100 atomic percent; a positive electrode; and a separator that is an electrolyte retentive nylon separator of uniform thickness, or a wettable polypropylene separator resistant to reaction with H$_2$ gas and alkaline electrolyte. As used herein, "electrolyte retentive" is specifically defined to mean capable of retaining sufficient electrolyte as a result of wettability and pore size distribution to reduce the effects of separator dryout commonly known as electrolyte redistribution; and "wettable" is specifically defined to mean that the polypropylene fibers have been treated to make them effectively absorb and retain electrolyte using means such as etching, radiation, or treatment with a chemical surfactant, where the chosen means does not produce by-products that adversely effect, i.e. "poison", the charge retention properties of the Ovonic Base Alloys of the present invention.

Another aspect of the present invention is a rechargeable hydrogen storage cell comprising a negative electrode having the following composition:

(Ovonic Base Alloy)$_a$Co$_b$Mn$_c$M$_d$ where Ovonic Base Alloy is the same as described above; a is at least 70 atomic percent; b is 0 to 7, preferably 4 to 7 atomic percent; c is 0.1 to 8, preferably 6 to 8 atomic percent; M repres at least one modifier chosen from the group consisting of 0.1 to 2.5, preferably 1 to 2.5 atomic percent Al, 0.1 to 6, preferably 1 to 2 or 5 to 6 atomic percent Fe, and 0.1 to 6, preferabl 5.5 to 6 atomic percent Mo; d is 0 to 8, preferably 4 to 6 atomic percent; b+c+d>0; and a+b+c+d=100 atomic percent; a positive electrode;and a stable nylon separator or wettable polypropylene separator as defined above.

DETAILED DESCRIPTION OF THE INVENTION

The Ovonic Base Alloys of the present invention can be formed into negative electrodes for metal hydride cells that exhibit significant quantitative improvements in cycle life and charge retention compared to prior art cells. Specific embodiments of these alloys are given in Table 1.

TABLE 1

1. $V_{22}Ti_{16}Zr_{16}Ni_{32}Cr_7Co_7$
2. $V_{20.6}Ti_{15}Zr_{15}Ni_{30}Cr_{6.6}Co_{6.6}Mn_{3.6}Al_{2.7}$
3. $V_{22}Ti_{16}Zr_{16}Ni_{39}Fe_7$
4. $V_{22}Ti_{16}Zr_{16}Ni_{34}Co_7Fe_6$
5. $V_{21}Ti_{15}Zr_{15}Ni_{31}Cr_6Co_6Fe_6$
6. $V_{15}Ti_{15}Zr_{21}Ni_{31}Cr_6Co_6Fe_6$
7. $V_{18}Ti_{15}Zr_{18}Ni_{31}Cr_6Co_6Fe_6$
8. $V_{22}Ti_{11}Zr_{21}Ni_{39}Fe_7$
9. $V_{18}Ti_{15}Zr_{18}Ni_{29}Cr_5Co_7Mn_8$
10. $V_{15}Ti_{15}Zr_{21}Ni_{31}Co_6Fe_6Mn_6$
11. $V_{15}Ti_{15}Zr_{20}Ni_{28}Cr_{5.3}Co_{5.3}Fe_{5.3}Mn_6$
12. $V_{16}Ti_{15}Zr_{20}Ni_{31}Cr_6Fe_6Mn_6$
13. $V_{18}Ti_{15}Zr_{18}Ni_{29}Cr_5Co_6Fe_1Mn_8$
14. $V_{18}Ti_{15}Zr_{18}Ni_{29}Cr_4Co_6Fe_2Mn_8$
15. $V_{15}Ti_{15}Zr_{21}Ni_{29}Cr_5Co_7Mn_8$
16. $V_{15}Ti_{15}Zr_{21}Ni_{29}Cr_5Co_6Fe_1Mn_8$
17. $V_{15}Ti_{15}Zr_{21}Ni_{29}Cr_4Co_6Fe_2Mn_8$
18. $V_{18}Ti_{15}Zr_{18}Ni_{28}Cr_2Co_5Mn_8Mo_6$

The Ovonic Base Alloys of the present invention can be further classified as having a heterogeneous, disordered microstructure resulting from changes in the composition of the elements of the alloy, wherein hydrogen in a particular phase is not easily discharged even through low surface area, or through an oxide having limited porosity or catalytic properties.

The addition of 6 to 8 atomic percent Mn results in increased storage capacity as well as low cell pressure and high cycle life.

Though not wishing to be bound by theory, it is believed that in the alloys of the present invention, Mn alters the microstructure in such a way that the precipitation of phases is inhibited thus leaving hydrogen bond strengths within the range of electrochemical usefulness. One way in which Mn appears to accomplishes this is by increasing the mutual solubility of the other elements during solidification. In addition, Mn functions at the electrochemically active surface oxide as a catalyst. The multiple oxidation states of Mn are believed to catalyze the electrochemical discharge reaction by increasing the porosity, conductivity, and/or the surface area of the active surface oxide film.

In the Ovonic Base Alloys of the present invention, Mn can replace Fe. Though not wishing to be bound by theory, it is believed that when Mn is present without Fe, Mn assists the electrochemical discharge reaction at low temperature by promoting bulk diffusion of hydrogen at low temperature and also by catalyzing the reaction of hydrogen and hydroxyl ions at the alloy surface. Because of the low temperature properties of these alloys, it appears that Mn's catalytic properties are emphasized when Fe is not present.

In the present invention, Mn can also be substituted for Co. In the resulting Ovonic Base Alloys, one can observe that hydrogen storage capacity increases while maintaining excellent charge retention. Though not wishing to be bound by theory, it is believed as discussed above, that Mn alters the microstructure and acts as a catalyst at the electrochemically active surface oxide.

Particularly preferred embodiments of the present invention contain negative electrodes of Ovonic Base Alloys modified with 7 to 8 atomic percent Mn; and 1 to 2 atomic percent Fe. Such Ovonic Base Alloy materials have, independently of the separator a long cycle life and improved charge retention.

The beneficial effects of Mn and Fe have been detailed in U.S. Pat. Nos. 5,096,667, 5,104,617, and U.S. patent application No. 07/746,015 (pending).

It is noted in U.S. Patent No.5,104,617 that it was widely believed that the inclusion of Fe in metal hydride hydrogen storage alloy materials would deleteriously effect electrochemical performance. This belief was due to the knowledge that Fe readily oxidizes and corrodes, particularly in the presence of an alkaline electrolyte. Oxidation reduces the performance of a metal hydride electrode in many ways, and oxides of Fe were known in the prior art to adversely affect the nickel hydroxide positive electrode, particularly with respect to charging efficiency and thus capacity and cycle life.

Still other embodiments of the present invention contain Ovonic Base Alloy negative electrodes that contain 4.5 to 5.5 atomic percent Co; 7.5 to 8 atomic percent Mn; and 5.5 to 6 atomic percent Mo.

The effects of the addition of Mn are discussed in detail in U.S. Pat. No. 5,096,667, the contents of which are incorporated herein by reference. The addition of Mn usually results in improved charging efficiency. Though not wishing to be bound by theory, this effect appears to result from Mn's ability to improve the charging efficiency of alloys it is added to by improving the oxidation resistance and oxygen recombination. It has been observed that oxygen gas generated at the nickel hydroxide positive electrode recombined at the surface of the metal hydride electrode. Oxygen recombination is an especially aggressive oxidizer of its environment, even compared to the alkaline electrolyte.

It is possible that the modifier elements, particularly Mn and Fe, and most particularly Co, either alone, or in combination with Mn and/or Al for example, act to catalyze the oxygen reduction, thereby avoiding or reducing the oxidation of the surrounding elements in the metal hydride alloy. It is believed that this function of the modified alloys reduces or even eliminates the formation and build up of detrimental surface oxide, thereby providing a thinner and more stable surface.

Though not wishing to be bound by theory, it is believed that several additional factors may explain the unexpected behavior of Mn and Fe in the alloys of the present invention:

(1) The combination of Mn and Fe may affect the bulk alloy by inhibiting the bulk diffusion rate of hydrogen within the metal through the formation of complex phase structures, either by effecting the grain boundaries or by affecting the equilibrium bond strength of hydrogen within the metal. In other words, the temperature dependance of the hydrogen bond strength may be increased thereby decreasing the available voltage and capacity available under low temperature discharge.

(2) It is believed that the combination of Mn and Fe may result in a lower electrode surface area for metallurgical reasons by increasing the ductility of the alloy and thereby reducing the amount of crack formation during the activation process.

(3) It is believed that the combination of Mn and excessive Fe in these alloys may inhibit low temperature discharge through the alteration of the oxide layer itself with respect to conductivity, porosity, thickness, and/or catalytic activity. The oxide layer is an important factor in the discharge reaction that must promote the reaction of hydrogen from the alloy and hydroxyl ion from the electrolyte. In addition, it is believed that this reaction is promoted by the thin, conductive, porous portion of this oxide layer which has some degree of catalytic activity.

The combination of excess Fe and Mn does not appear to be a problem under room temperature discharge, but has shown a surprising tendency to retard the low temperature reaction. The formation of a complex oxide could result in a subtle change in oxide structure such as pore size distribution or porosity. Since the discharge reaction produces water at the metal hydride surface and within the oxide itself, a small pore size may be causing a slow diffusion of $K^+$ and $OH^-$ ions from the bulk of the electrolyte to the oxide. Under room temperature discharge where polarization is almost entirely ohmic to low temperature discharge where activation and concentration polarization components dominate, physical structure of the oxides with Fe and Mn compared to Mn alone could be the explanation.

Compared to Mn above, it is also possible that Mn and Fe have multivalent oxidation states. It is considered possible that some elements within the oxide may in fact change oxidation state during upward electrolyte state of charge variance and rate of discharge. It is equally possible that each of these multiple oxidation states has a different catalytic activity as well as different densities that together effect oxide porosity.

A possible problem with a complex oxide containing both Mn and excess Fe could be that the Fe component retards the ability of the Mn to change oxidation state if present in large quantities.

Throughout the preceding discussion with respect to the oxide it should be noted that the oxide also contains other components of the Ovonic Base Alloy such as V, Ti, Zr, Ni, and Cr as well as any other modifier elements added. The discussion of a complex oxide of Mn and Fe is merely for the sake of brevity and one skilled in the art should not infer that the actual mechanism cannot also include a more complex explanation involving other elements.

Alloy modification offers tremendous cost advantages as well as performance advantages. These cost advantages can be up to 30%. The price of V is a predominant component in the cost of Ovonic alloys. In U.S. Pat. No. 5,002,730, incorporated by reference, V in the form of V-Ni offers significant cost advantages over pure V in cost. Such cost improvements can, of course, be increased through the use of V-Fe.

The Ovonic Base Alloys of the present invention when used in conjunction with the separator materials described below, have demonstrated improved performance over prior art alloys for electrochemical applications.

Using the Ovonic Base Alloys described above, it was determined through cell failure analysis that nylon separators cause high cell polarization as a result of the loss of electrolyte from the separator which is primarily caused by the absorption of electrolyte by the electrodes. In virtually all sealed rechargeable cells, the separator and electrodes are disposed in direct contact with one another. Thus, the relative capillary action of the electrodes and the separator determine the equilibrium amount of electrolyte retained within each component. After repeated use, however, the capillary action capabilities of Ovonic Base Alloy negative electrodes of the present invention, as well as the nickel hydroxide positive electrodes, increase. It is believed that this occurs because repeated charge and discharge cycling increases the porosity of the electrodes of the present invention by creating new pores and/or making finer pores. This increase in porosity appears related in some degree to the changes in surface area and surface roughness discussed in detail in U.S. Pat. No. 4,728,586 to Venkatesan, et al., which is incorporated herein by reference. Similarly, the capillary action of the positive electrode also increases. As a result, the electrodes become capable of absorbing more electrolyte and equilibrium amounts of electrolyte shift toward the electrodes.

Without wishing to be bound by theory, it is believed that the following characteristics of the separators of the present invention contribute to improved cell cycle life as a result of greater electrolyte capacity and better electrolyte retention characteristics:

1) separators of the present invention have a weight to unit area ratio less than that of the standard nylon separator;

2) separators of the present invention have an uncompressed thickness greater than the uncompressed thickness of the standard nylon separator; and/or 3) separators of the present invention have pores smaller than the pores of prior art separators. (This approach is in contrast to the teaching in U.S. Patent No. 5,077,149 which uses zinc oxide to alter the absorption characteristics of the positive electrode.)

During the cell assembly process, a standard nylon separator is usually compressed to approximately 6 mils. Standard nylon separators typically have a weight to unit area ratio of 70 $g/m^2$ and an uncompressed thickness of 9 mils.

The "high loft" nylon and polypropylene separators of the present invention are of uniform thickness and have a weight to unit ratio that is usually less than that of a standard nylon separator. By definition, "high loft" separators are separators capable of absorbing and retaining more electrolyte than standard nylon separators while retaining excellent resistance to electrical short circuit. High loft separators of the present invention have a layer weighing less than about 70 $g/m^2$; preferably not more than 60 $g/m^2$.

The separators of the present invention also have an uncompressed thickness greater than the uncompressed thickness of standard nylon separators Preferably, the high loft separators of the present invention have an uncompressed thickness greater than 9 mils; most preferably about 14 mils. The present invention also includes separators that when uncompressed are 14% lighter and 15% thicker than the standard nylon separator. As a result of these features, separators of the present invention are capable of absorbing and retaining 15% more electrolyte solution than a standard nylon separator.

Ovonic Base Alloy cells of the present invention using improved separators have an increased cycle life and an increased life span compared to a standard rechargeable Ni-MH cell. The best prior art Ovonic alloy rechargeable Ni-MH cells using standard nylon separators are capable of withstanding approximately 800 cycles at 100% discharge depth. In contrast, the Ovonic Base Alloy cells of the present invention can have a life span of at least 1,000 cycles at 100% depth of discharge. (See, Table 2, below.)

A standard nylon separator is typically formed from nonwoven 18 micron thick fibers resulting in material having pores approximately 15-18 microns in size. In contrast, a nylon separator of the present invention has pores that are less than 5 microns and the separator itself is formed from nonwoven fibers 5-12 microns thick.

In the present invention, pore size directly affects the capillary action associated with the separator. Pores of reduced size allow for increased adhesion force between the molecules of the electrolyte solution and the molecules of the separator. This adhesion force tends to draw more of the electrolyte solution into the separator and away from the electrodes and, because of its relative strength, tends to more effectively retain the electrolyte solution in the separator. Thus, the smaller pore size slows the saturation of the electrodes with electrolyte and improves the cycle life of the overall cell.

Preferably, the fibers used to fabricate separators of the present invention are less than or equal to 12 microns thick and have pores less than or equal to 3 microns in size. Such fibers are capable of absorbing and retaining 15% more electrolyte solution than prior art separators which results in increased cell life spans.

Even finer fibers, about 6 to 8 microns thick, can be utilized. Separators of the present invention made with such fibers have pores of about 1 micron. Such separators are capable of absorbing and retaining even more electrolyte solution than the 12 micron fiber material of the standard nylon separator.

Another aspect of the present invention is the observation that Ovonic alloy cells have a greater sensitivity to self discharge than NiCd and Ni-MH batteries using $AB_5$ type alloys. Quite unexpectedly, the present inventors have found that when the Ovonic Base Alloys of the present invention are combined with the separators of the present invention that this problem can be largely overcome. It is preferred that wettable polypropylene separators of the present invention be used to attain the maximum charge retention because wettable polypropylene, as described herein, is extremely stable in Ovonic Base Alloy cells of the present invention.

The greatest problem with untreated polypropylene fibers is that in contrast to nylon fibers, which are very hydrophilic, untreated polypropylene fibers are very hydrophobic. In order to use polypropylene fibers for the separators of the present invention, they must be treated to make them "wettable" so that they will effectively absorb and retain electrolyte solution. This is normally accomplished using radiation graft techniques (using a variety of radiation sources such as ultraviolet radiation, cobalt source radiation, or gamma rays), etching techniques using various chemicals (such as sulfuric acid), or treatment with a chemical surfactant to produce a wettable material.

Figure 1:
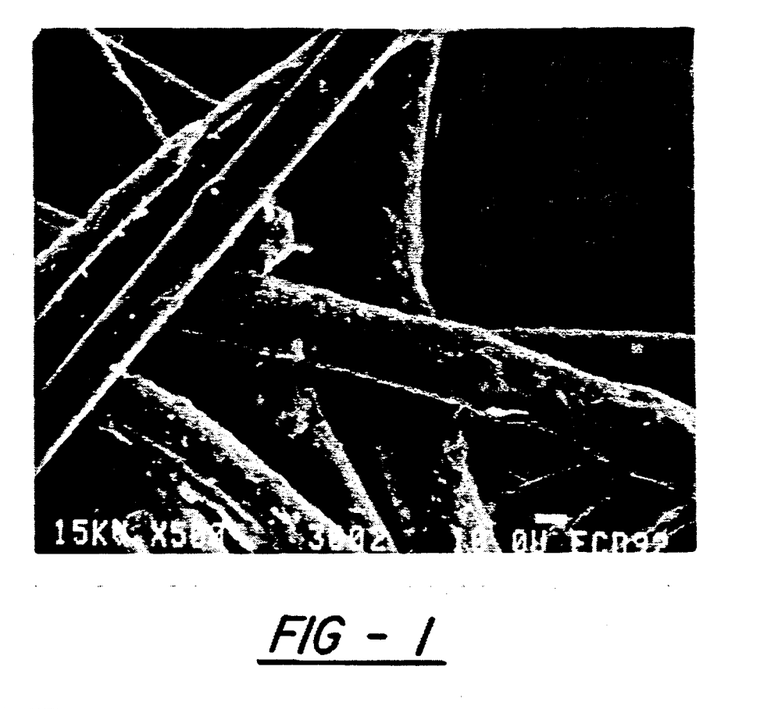
FIG. 1 is a scanning electron micrograph of a polypropylene separator in which the hydrophilic coating is discontinuous and has a variety of loose particles and barbs.
Figure 2:
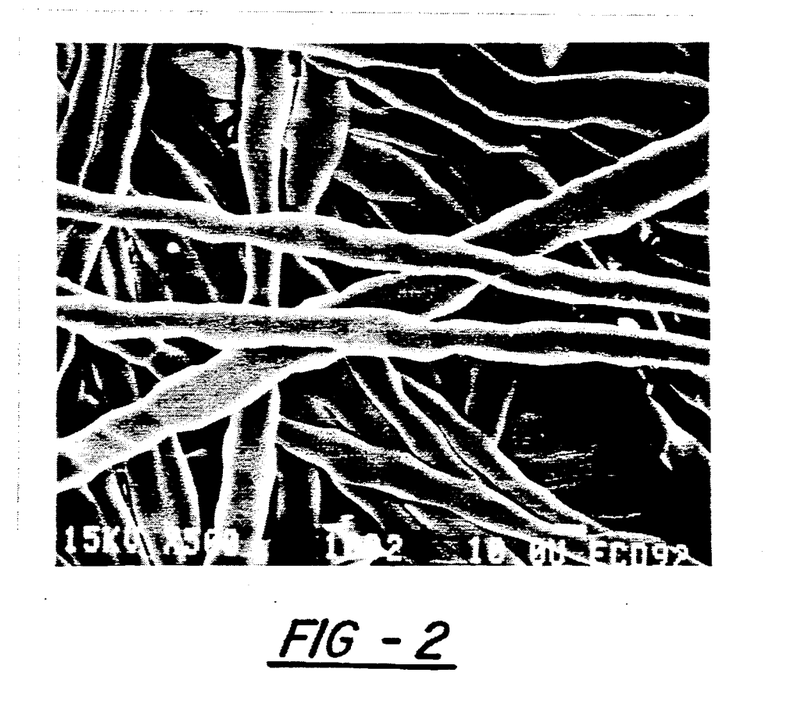
FIG. 2 is a scanning electron micrograph of a wettable polypropylene separator, as defined above, in which the coating is continuous and impenetrable.

Some care must be used to chose a technique that will render the surface of the polypropylene "wettable" within the context of this term as defined above. That is, the treatment must be one that does not produce particles, barbs, residue, etc. as illustrated in FIG. 1. It is theorized that such residues have the capability of "poisoning" the Ovonic Base Alloys of the present invention by depositing on the nickel hydroxide positive electrode and lowering oxygen stability or forming redox shuttle mechanisms or forming decomposition products affecting one or both of the above self discharge mechanisms that lower the overall charge retention of the cell. Preferred wettable polypropylene separators of the present invention are ones in which the individual fibers have a continuous coating as illustrated in FIG. 2. Ovonic Base Alloy cells of the present invention using a wettable polypropylene separator having such a continuous coating over the individual fibers have significantly increased charge retention over the prior art.

Methods of providing wettability, or absorption of electrolyte to the polypropylene are also critical in the self-discharge behavior of the battery. Residual sulfates from the sulfonation process, surfactants, and residual impurities from the radiation grafting processes can all effect self-discharge.

The wettable polypropylene separators of the present invention are quite different from the sulfonated polypropylene separator described in U.S. Pat. No. 5,077,149 discussed above. The '149 patent makes no mention of improved charge retention, describes the use of a misch metal alloy rather than an Ovonic Base Alloy of the present invention, and describes treating a polypropylene separator impregnated with zinc oxide with a hydrophobic resin rather than a wetting agent.

In particular, the inventors of the present invention have discovered that the mere use of a polypropylene separator, even a sulfonated polypropylene separator, is by no means a guarantee of low self-discharge and that self-discharge is effected by the separator material manufacturing process as well as the kind of negative alloy materials used.

It is preferred that radiation grafted wettable polypropylene separators that are continuous and impenetrable as described above (cf, FIG. 1 and FIG. 2) be used in the Ovonic Base Alloy cells of the present invention to attain cells having a minimum self discharge. Without wishing to be bound by theory, it is believed that this is because these kind of grafted polypropylene separators represent the highest purity wettable polypropylene currently available, that is they have minimal particles, barbs, residue, or "poisons" to effect the Ovonic Base Alloys of the present invention; and that the grafted coating is applied in such a way as to produce the most continuous, impenetrable, alkali resistant, and hydrogen gas resistant wettable coating for the polypropylene separator used with the Ovonic Base Alloys of the present invention. It is believed that these previously undisclosed impurities affect self-discharge in the Ovonic Base Alloy when they are decomposed by the alkaline electrolyte and the hydrogen gas that is present during the normal operation of these cells.

Preferred embodiments of the present invention employ the appropriate combination of a described Ovonic Base Alloy with a described separator to attain the maximum cycle life and/or charge retention.

Most preferred embodiments of the present invention employ a "high loft" wettable polypropylene separator having fibers and pores of the preferred sizes described above.

The Ovonic Base Alloy cells of the present invention can be used in a variety of configurations. Containers for these cells may be any suitable housing, such as a plastic or metal, which does not deteriorate or react with the cell electrolyte and which allows venting of the cell should it produce an overpressure beyond a predetermined limit during its operation.

The Ovonic Base Alloy cells of the present invention can be configured, for example, as flat cells that include a substantially flat plate negative electrode, a current collector in electrical contact with the active material of the electrode and a contact tab in electrical communication with an electrical lead, a positive electrode or counter-electrode that is substantially flat and aligned with the negative electrode; or as jelly-roll type cells made by spirally winding a flat cell about an axis.

The electrodes of the cells of the present invention are immersed in an appropriate electrolyte. A preferred electrolyte is a 30 weight percent aqueous solution of potassium hydroxide.

The Ovonic Base Alloys of the present invention are formulated into negative electrode materials without the use of binders, such as polyethylene. Binders have been shown to promote high rates of self discharge in the Ovonic Base Alloys of the present invention. See, U.S. Pat. No. 4,915,898, discussed further below.

Clearly, various configurations of cells and batteries may be structured in accordance with the described invention. Thus, the present invention is not intended to be limited to the embodiments exemplified in this application. This invention is illustrated further by reference to the following non-limiting examples.

EXAMPLES

Preparation of Negative Electrode Materials

The Ni-MH materials shown in the Examples below were prepared by weighing and mixing powders of the component elements into a graphite crucible. The crucible and its contents were placed in a vacuum furnace which was evacuated and then pressurized with approximately one atmosphere of argon. The crucible contents were melted by high frequency induction heating while under the argon atmosphere. The melting was carried out at a temperature of about 1500° C. until a uniform melt was obtained. At that time, the heating was terminated and the melt was allowed to solidify under a blanket inert atmosphere.

The ingot of alloy material was then reduced in size in a multi-step process. The first step involved a hydriding/dehydriding process substantially as described in U.S. Pat. No. 4,983,756 entitled Hydride Reactor Apparatus for Hydrogen Comminution of Metal Hydride Hydrogen Storage Alloy Material, the disclosure of which is specifically incorporated by reference. In this first step, the alloy was reduced in size to less than 100 mesh. Subsequently, the material obtained from the hydriding/dehydriding process was further reduced in size by an impact milling process in which the particles were tangentially and radially accelerated against an impact block. This process is described in U.S. Pat. No. 4,91 5,898 entitled Improved Method for the Continuous Fabrication of Comminuted Hydrogen Storage Alloy Negative Electrode Material, the disclosure of which is specifically incorporated by reference.

A fraction of the alloy material having a particle size of less than 200 mesh and a mass average particle size of about 400 mesh (38 microns) was recovered from the impact milling process and bonded to a nickel screen current collector by disposing a layer of alloy material onto the current collector and compacting the powder and collector. This method does not use a binder. Compacting was carried out under an inert atmosphere with two separate compaction steps, each at a pressure of about 16 tons per square inch. After compaction, the current collector and the powder adhered to it were sintered in an atmosphere of about 2 atomic percent hydrogen with the balance argon to form negative electrode materials.

These negative electrode materials were activated using the alkaline etch treatment described in U.S. Pat. No. 4,716,088, the disclosure of which is specifically incorporated by reference.

Preparation of Cells

The prepared negative electrodes, separator, nickel hydroxide positive electrodes, and 30% KOH electrolyte were assembled into "C" cells. The specific separator chosen is indicated in the Examples.

EXAMPLES 1

Cells were prepared as described above using alloy #5 of Table 1 and a standard nylon separator, a high loft nylon separator, and a fine fiber diameter nylon separator. The finished cells were subjected to charging and discharging conditions and the cycle life determined. It is to be understood that the concepts of high loft and fine fiber diameter can be combined.

TABLE 2

| Alloy | Separator | Cycle Life (TCO 32° C.) |
|---|---|---|
| 5 | nylon | 550 |
| 5 | high loft nylon | 1200 |
| 5 | fine fiber nylon | 1000 |

Example 2

C cells were prepared using alloy #6 of claim 1 with the separator materials shown in Table 3. The resulting cells were subjected to a 30 day charge retention testing at room temperature.

The results obtained are set forth in Table 3, below.

TABLE 3

| ALLOY | Separator | Charge Retention % 30 days |
|---|---|---|
| 6 | radiation grafted pp | 80 |
| 6 | radiation grafted pp | 76 |
| 6 | chemically treated pp | 70 |
| 6 | standard pp | 60 |
| 6 | propylene polyethylene blend | 10 |
| 6 | standard nylon | 40 |
| 6 | fine fiber nylon | 50 |

Example 3.

Cells were prepared as described above using the alloys listed in Table 4, standard nylon separators, and a variety of polypropylene separators. The "polypro1" separators are standard untreated polypropylene separators. The "polypro2" separators are polypropylene separators treated with chemical surfactants. The "treated polypro" separators are radiation grafted polypropylene separators having a continuous and impenetrable surface (as shown in FIG. 2) manufactured by SCIMAT. The finished cells were subjected to charging and discharging conditions and their charge retention determined.

The data obtained from these tests is set forth in Table 4, below.

TABLE 4

| ALLOY | separator type | Charge Retention (22° C.) | | |
|---|---|---|---|---|
| | | 3 days | 14 days | 28 days |
| 1 | nylon | 72 | 32 | 8 |
| 9 | nylon | 76 | 37 | 20 |
| 9 | polyprol | 78 | 42 | 22 |
| 9 | treated polypro | 88 | 67 | 47 |
| 14 | nylon | 83 | 61 | 42 |
| 14 | treated polypro | 91 | 82 | 72 |
| 15 | nylon | 91 | 71 | 54 |
| 15 | polypro2 | 92 | 76 | 61 |
| 15 | treated polypro | 95 | 89 | 81 |
| 17 | nylon | 92 | 88 | 83 |
| 17 | treated polypro | 96 | 94 | 89 |

Each of the above examples has been described in detail apart from one another. However, the various embodiments of the present invention can also be practiced in combination. Most easily combined are the "high loft" characteristics and the "fine fiber" characteristics is also possible to combine these features with a wettable polypropylene separator to produce a cell having excellent cycle life as well as excellent charge retention. All possible combinations of the features described in the DETAILED DESCRIPTION OF THE INVENTION and the EXAMPLES are considered to be within the scope of the present invention.

Further, it is obvious to those skilled in the art that the invention may be prepared by additional methods, using additional compositions, and different configurations (such as other cell sizes) without departing from its spirit and scope.

The drawings, discussion, descriptions, and examples of this specification are merely illustrative of particular embodiments of the invention and are not meant as limitations upon its practice. It is the following claims, including all equivalents, that define the scope of the invention.

What is claimed is:

1. A rechargeable hydrogen storage cell comprising:
a negative electrode having the following composition:

(Ovonic Base Alloy)$_a$M$_b$ where
Ovonic Base Alloy represents an Ovonic alloy that contains 0.1 to 60 atomic percent Ti, 0.1 to 25 atomic percent Zr, 0.1 to 60 atomic percent V, 0.1 to 57 atomic percent Ni, and 0.1 to 56 atomic percent Cr, as described above;
a is at least 70 atomic percent;
M represents at least one modifier chosen from the group consisting of Co, Mn, Al, Fe, W, La, Mo, Cu, Mg, Ca, Nb, Si, and Hf;
b is 0 to 30 atomic percent;
b>0; and
a+b=100 atomic percent;
a positive electrode; and
a separator chosen from the group consisting of an electrolyte retentive, fine fiber, having a thickness of approximately 5-12 microns nylon separator and a wettable polypropylene separator resistant to reaction with H$_2$ gas and alkaline electrolyte, where the surface of said wettable polypropylene has been treated using radiation grafting or a chemical treatment.

2. The rechargeable hydrogen storage cell of claim 1, wherein said negative electrode has the following composition:

(Ovonic Base Alloy)$_a$Co$_b$Mn$_c$M$_d$ where
a is at least 70 atomic percent;
b is 0 to 7 atomic percent;
c is 0.1 to 8 atomic percent;
M represents at least one modifier chosen from the group consisting of 0.1 to 2 atomic percent Al, 0.1 to 6 atomic percent Fe, 0.1 to 4 atomic percent La, and 0.1 to 6 atomic percent Mo; d is 0 to 8 atomic percent;
b+c+d>0;and
a+b+c+d=100 atomic percent.

3. The rechargeable hydrogen storage cell of claim 1, wherein said separator is a high loft separator of uniform thickness having a weight of less than about 70 g/m$^2$.

4. The rechargeable hydrogen storage cell of claim 1, wherein said separator is formed from fibers having a thickness of less than 18 microns.

5. The rechargeable hydrogen storage cell of claim 1, wherein said separator has a thickness of 5 to 12 microns and is formed of fibers oriented to produce pores less than 5 microns.

6. The rechargeable hydrogen storage cell of claim 1, wherein said separator has a weight of less than 60 g/m$^2$.

7. The rechargeable hydrogen storage cell of claim 1, wherein said separator has an uncompressed thickness greater than 9 mils.

8. The rechargeable hydrogen storage cell of claim 1, wherein said separator has an uncompressed thickness greater than 14 mils.

9. The rechargeable hydrogen storage cell of claim 1, wherein said fibers are less than or equal to 12 microns thick.

10. The rechargeable hydrogen storage cell of claim 1, wherein said fibers are less than or equal to 8 microns thick.

11. The rechargeable hydrogen storage cell of claim 5, wherein said separator has pores less than 3 microns in size.

12. The rechargeable hydrogen storage cell of claim 5 wherein said separator has pores less than 1 micron in size.

13. The rechargeable hydrogen storage cell of claim 12, wherein said separator is a stable nylon.

14. The rechargeable hydrogen storage cell of claim 12, wherein said separator is a wettable polypropylene.

15. The rechargeable hydrogen storage cell of claim 2, wherein b is 4 to 7 atomic percent.

16. The rechargeable hydrogen storage cell of claim 2, wherein c is 6 to 8 atomic percent.

17. The rechargeable hydrogen storage cell of claim 2, wherein d is 4 to 6 atomic percent.

18. The rechargeable hydrogen storage cell of claim 2, wherein M represents at least one modifier chosen from the group consisting of 1 to 2.5 atomic percent Al, 1 to 2 or 5 to 6 atomic percent Fe, and 5.5 to 6 atomic percent Mo.

19. The rechargeable hydrogen storage cell of claim 2, wherein M represents 1 to 2.5 atomic percent Al and 1 to 2 or 5 to 6 atomic percent Fe.

20. The rechargeable hydrogen storage cell of claim 2, wherein M represents 5.5 to 6 atomic percent Mo.

21. The rechargeable hydrogen storage cell of claim 2, wherein b is 5 to 7 atomic percent; c is 7 to 8 atomic percent; and M is 1 to 2 atomic percent Fe.

22. The rechargeable hydrogen storage cell of claim 2, wherein b is 4.5 to 5.5 atomic percent; c is 7.5 to 8 atomic percent; and M is 5.5 to 6.5 atomic percent Mo.

* * * * *